United States Patent
Semper

(10) Patent No.: US 8,483,193 B2
(45) Date of Patent: Jul. 9, 2013

(54) LEGACY MOBILE STATION SUPPORT ON SIP-BASED FEMTO DEVICE

(75) Inventor: William J. Semper, Richardson, TX (US)

(73) Assignee: Samsung Electronics Co., Ltd, Suwon-Si (KR)

( * ) Notice: Subject to any disclaimer, the term of this patent is extended or adjusted under 35 U.S.C. 154(b) by 1246 days.

(21) Appl. No.: 12/315,981

(22) Filed: Dec. 9, 2008

(65) Prior Publication Data

US 2010/0034179 A1    Feb. 11, 2010

Related U.S. Application Data

(60) Provisional application No. 61/188,210, filed on Aug. 7, 2008.

(51) Int. Cl.
*H04W 4/00* (2009.01)

(52) U.S. Cl.
USPC .......................................... 370/338; 370/328

(58) Field of Classification Search
USPC ................................................. 370/310–350
See application file for complete search history.

(56) References Cited

U.S. PATENT DOCUMENTS

| | | | |
|---|---|---|---|
| 2005/0141462 A1 * | 6/2005 | Aerrabotu et al. | 370/335 |
| 2006/0135177 A1 * | 6/2006 | Winterbottom et al. | 455/456.1 |
| 2006/0221893 A1 * | 10/2006 | Kiss | 370/328 |
| 2007/0025337 A1 * | 2/2007 | Polk | 370/352 |
| 2008/0267172 A1 * | 10/2008 | Hines et al. | 370/352 |
| 2008/0293433 A1 * | 11/2008 | Wallis | 455/456.1 |
| 2009/0067417 A1 * | 3/2009 | Kalavade et al. | 370/356 |
| 2009/0111427 A1 * | 4/2009 | Mack et al. | 455/411 |
| 2009/0147775 A1 * | 6/2009 | Marshall et al. | 370/352 |
| 2010/0046506 A1 * | 2/2010 | Feldman et al. | 370/352 |
| 2010/0048176 A1 * | 2/2010 | Osborn | 455/411 |
| 2011/0026510 A1 * | 2/2011 | Matsumura et al. | 370/338 |
| 2012/0290921 A1 * | 11/2012 | Mitchell | 715/234 |

* cited by examiner

*Primary Examiner* — Warner Wong

(57) ABSTRACT

A Femto network capable of relaying wireless communications is provided. The Femto network includes a Femto Access Point (FAP) and an MSC Femto Interworking Function (MFIF). The FAP and the MFIF each include a modified XML schema. The FAP modified XML schema is configured to include subscriber station identification information in a Presence Information Data Format Location (PIDF-LO) signal. The FAP is configured to transmit said the PIDF-LO via session initiation protocol. The MFIF XML schema is configured to interpret the PIDF-LO signal and extract the subscriber station identification information from said PIDF-LO signal. The MFIF is configured to send said messages and said subscriber station information to a mobile switching center (MSC).

20 Claims, 2 Drawing Sheets

LEGACY MOBILE STATION SUPPORT ON SIP-BASED FEMTO DEVICE

CROSS-REFERENCE TO RELATED APPLICATION(S) AND CLAIM OF PRIORITY

The present application is related to U.S. Provisional Patent No. 61/188,210, filed Aug. 7, 2008, entitled "LEGACY MOBILE STATION SUPPORT ON SIP-BASED FEMTO DEVICE". Provisional Patent No. 61/188,210 is assigned to the assignee of the present application and is hereby incorporated by reference into the present application as if fully set forth herein. The present application hereby claims priority under 35 U.S.C. §119(e) to U.S. Provisional Patent No. 61/188,210.

TECHNICAL FIELD OF THE INVENTION

The present application relates generally to wireless communication systems and, more specifically, to a FEMTO Access Point and communication network.

BACKGROUND OF THE INVENTION

Femtocell devices are small base stations designed for home or small business use. Femtocell devices operate in a small (<200 m) range and are designed to provide cellular coverage in the home or office. The typical femtocell device connects to a Security Gateway or Softswitch over an Interent Protocol (IP) connection, such as a DSL or broadband cable connection. The Security Gateway or Softswitch are intended to plug into the DSL or cable modem using a standard Ethernet cable.

Connecting a Femto Access Point (FAP) to an operator's network is the subject of standardization in various standards bodies. One solution is to connect the FAP through a Femto Gateway, or (FGTW) to an IP Multimedia Subsystem (IMS) network. This solution requires that the FAP or the FGTW contains a Session Initation Protocol (SIP) client, and that SIP (defined under RFC3261) is used to establish a session between the FAP and other entities in the network with which the FAP must communicate. Since the FAP is required to support legacy mobiles (e.g., subscriber stations) in any deployment, the FAP must support signaling associated with existing air interface specifications—such as, for example, cdma2000. The signaling messages sent to and from the Subscriber Station (SS) is defined by TIA-2000. The signalling messages are communicated to the core network entities that understand this signaling (e.g. a Mobile Switching Center (MSC)). Since the existing network standards for forwarding signaling information to the MSC (i.e., TIA-2001) do not support SIP, an interworking entity is utilized. The interworking entity allows the signaling information sent from the FAP to be forwarded to an MSC. Futher, the interworking entitiy allows return signaling from the MSC destined for the SS to be forwarded to the FAP using SIP. One such interworking entity is a MSC Femto Interworking Function (MFIF).

Current Femtocell networks do not allow for the transport of all information that the MSC needs to process important messages received at a SIP-based FAP from a legacy (e.g., cdma2000) SS. For example, when the SS sends a Registration message to the FAP, the FAP must include information about the SS's identity and other authentication data in order for the MSC to process the registration. The current definition of Presence Information Data Format (PDIF) does not allow for this information to be transported. Therefore, the MFIF is not be able to form the message properly to send to the MSC.

Therefore, there is a need in the art for an improved method of obtaining device information in a Femtocell. In particular, there is a need for a device that is capable of communicating location information via a Femto gateway using a session initiation protocol.

SUMMARY OF THE INVENTION

A Femto Access Point (FAP) capable of relaying wireless communications is provided. The FAP includes a modified XML schema configured to include subscriber station identification information in a Presence Information Data Format Location (PIDF-LO) signal. The FAP is configured to transmit the PIDF-LO via session initiation protocol.

A Femto network capable of relaying wireless communications is provided. The Femto network includes a Femto Access Point (FAP) and an MSC Femto Interworking Function (MFIF). The FAP includes a first modified XML schema configured to include subscriber station identification information in a Presence Information Data Format Location (PIDF-LO) signal. The FAP is configured to transmit the PIDF-LO via session initiation protocol. The MFIF includes a second XML schema configured to interpret the PIDF-LO signal and extract the subscriber station identification information from said PIDF-LO signal. The MFIF is configured to send said messages and said subscriber station information to a mobile switching center (MSC).

A method for communicating messages via an internet protocol is provided. The method receiving a message signal via a session initiation protocol from a Femto Access Point (FAP). The method also includes using a modified XML schema to extract subscriber station identification information from a Presence Information Data Format Location (PIDF-LO) signal. Further, the method includes sending the messages and subscriber station identification information to a mobile switching center Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
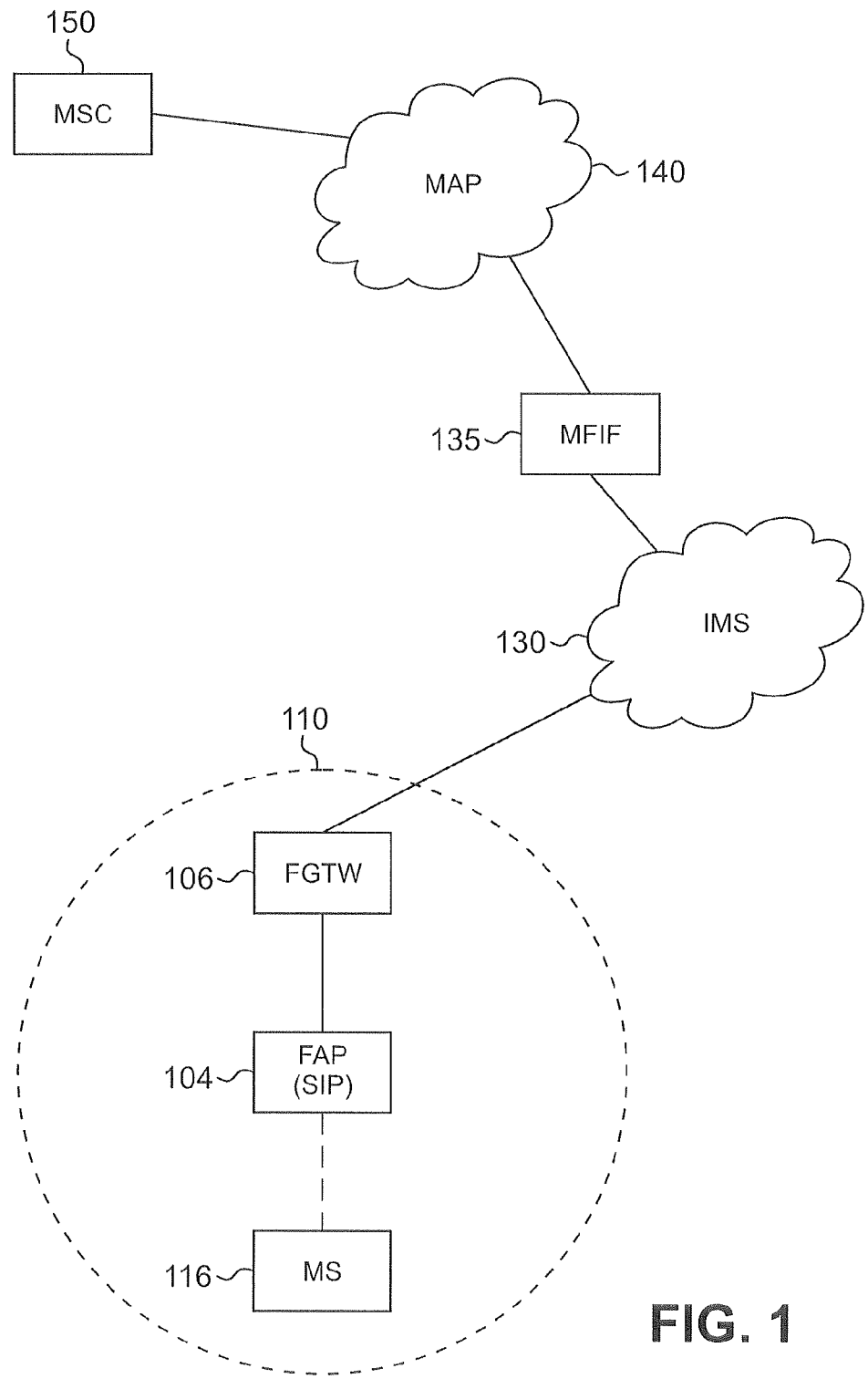
FIG. 1 illustrates a Femtocell Network according to embodiments of the present disclosure.
Figure 2:
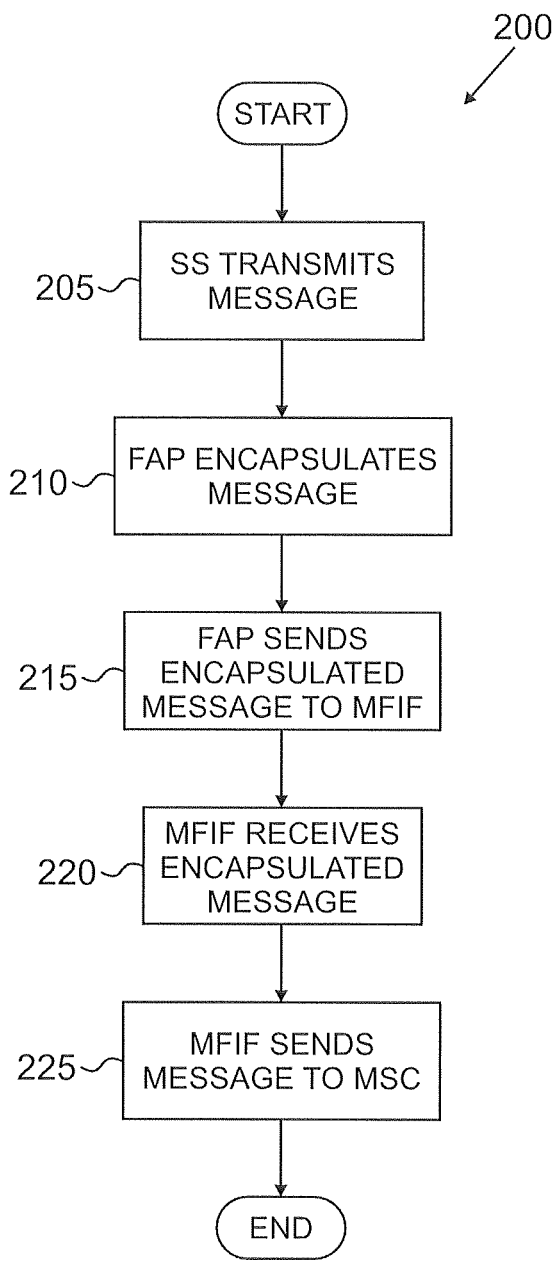
FIG. 2 illustrates a process for sending mobile station idenfitication information according to embodiments of the present disclosure.

FIGS. 1 through 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

FIG. 1 illustrates a Femtocell Network according to embodiments of the present disclosure. The embodiment of the Femtocell network 100 shown in FIG. 1 is for illustration only. Other embodiments of the Femtocell network 100 could be used without departing from the scope of this disclosure.

FAP 104 provides wireless broadband access to IMS 130, via FTGW 106, to a first plurality of subscriber stations within coverage area 110 of FAP 105. A Subscriber Station 116 couples to the FAP 104. Subscriber Station 116 may be any of a number of mobile devices, including a wireless-enabled laptop computer, personal data assistant, notebook, handheld device, or other wireless-enabled device. Furthermore, while only one subscriber station is shown in FIG. 1, it is understood that Femtocell network 100 may provide wireless broadband access to more than one subscriber station.

Dotted lines show the approximate extents of coverage area 110, which is shown as approximately circular for the purposes of illustration and explanation only. It should be clearly understood that the coverage areas associated with Femto Access Points, for example, coverage area 110, may have other shapes, including irregular shapes, depending upon the configuration of the Femto Access Points and variations in the radio environment associated with natural and man-made obstructions.

Also, the coverage areas associated with Femto Access Points are not constant over time and may be dynamic (expanding or contracting or changing shape) based on changing transmission power levels of the Femto Access Points and/or the subscriber stations, and other factors. In an embodiment, the radius of the coverage areas of the Femto Access Points, for example, coverage area 110 of FAP 104, may extend in the range from less than one meter (1 m) to about two hundred meters (200 m) from the base stations.

FTGW 104 may be connected directly to the IMS 130 by means of a wired broadband connection, such as an optical fiber, DSL, cable or T1/E1 line. The IMS 130 includes a plurality of servers including application servers and media servers. The IMS 130 is an architectural framework for delivering internet protocol (IP) multimedia services. The IMS 130 uses Internet protocols such as Session Initiation Protocol (SIP). The IMS 130 aids the access of multimedia and voice applications across wireless and wireline terminals, i.e., aids a form of fixed mobile convergence (FMC).

The FTGW 106 couples to a MFIF 135 via the IMS 130. Further, the MFIF 135 couples via a Media Access Protocol (MAP) 140 to a MSC 150. Thereafter, the MSC 150 interfaces with the public switched telephone network (PSTN) and other communications networks to setup and release end-to-end connections as is known in the art.

When the SS 116 and the FAP 104 establish communications, message signaling is transmitted from the SS 116 to the MSC 150. The message signals include location determination information regarding the SS 116.

Location determination is an important feature in all wireless networks. For SIP-based FAPs 104, the location of the SS 116 can be sent to the MSC 150 (via the MFIF 135) using an XML-based Presence Information Data Format. Use of the PIDF allows the encapsulation of location information within a presence document. For location determination information, a specific format (PDIF-LO) is defined. In the SIP message, PIDF-LO is carried as a Multipurpose Internent Mail Extention (MIME) body with an encapsulating set of MIME headers. The receiving entity uses a set of rules (XML schema) to interpret the message.

The FAP 104 receives the message signaling from the SS 116. The FAP 104 includes a modified XML schema. The modified XML schema rules translate the PDIF-LO element to include subscriber station identification information such as, but not limited to, Mobile Station Identity (IMSI), Authentication parameters (including AUTHR, RANDC, RAND), and possibly other information needed to identify the mobile and its capabilities (electronic serial number (ESN), Mobile Equipment Identifier (MEID), mobile capabilites, classmark information). The FAP 104 encapsulates the message signaling as an encapsulated message (e.g., as a MIME message). Thereafter, the FAP 104 transmits the message signaling using SIP via the FGTW 106 and the IMS 130 to the MFIF 135.

The MFIF 135 receives the encapsulated message signaling from the FAP 104. The MFIF 135 decapsulates (opens) the encapsulated message signaling. The MFIF 135 also includes a modified XML schema. The modified XML schema rules allows the MFIF 135 to interpret the modified PDIF-LO element. As such, the MFIF 135 is configured to interpret the PDIF-LO element and extract the subscriber station identification information, such as, but not limited to Mobile Station Identity (IMSI), Authentication parameters (including AUTHR, RANDC, RAND), and possibly other information needed to identify the mobile and its capabilities (ESN, MEID, Mobile Capabilites, Classmark Information).

Thereafter, the MFIF 140 transmits the decapsulated message signaling to the MSC 150. The decapsulated message signalling is formated in the same, or similar format, as originally transmitted by the SS 116. Therefore, even though the original message signalling from the SS 116 is transmitted via SIP, the MSC 150 receives the message signaling as if the SS 116 had transmitted via a standard base station as is known in the art (e.g., as if transmitted via cdma2000).

FIG. 2 illustrates a process for sending mobile station idenfitication information according to embodiments of the present disclosure. The embodiment of the sending process 200 shown in FIG. 2 is for illustration only. Other embodiments of the sending process 200 could be used without departing from the scope of this disclosure.

In step 205, the subscriber station 116 transmits a message signal. The message signal may be intended for any of a number of receipients. However, the message signal is sent via the Femto network 100 to be formated for processing (e.g., call setup) by the MSC 150.

The FAP 104 receives and encapsulates the message signal in step 210. The FAP 104 uses the modified XML schema to translate the PDIF-LO element to include subscriber station identification information such as, but not limited to, Mobile Station Identity (IMSI), Authentication parameters (including AUTHR, RANDC, RAND), and possibly other information needed to identify the mobile and its capabilities (ESN, MEID, Mobile Capabilites, Classmark Information).

In step 215, the FAP 104 sends the encapsulated message to the MFIF 135 via the FGTW 106 and IMS 130. The FAP 104 transmits the message using session initiation protocol. One or more servers within the IMS 130 use the session initiation protocol to route the encapsulated message to the MFIF 135.

In step 220, the MFIF 135 recieves the encapsulated message from the FAP 104 via the IMS 130 and FGTW 104. The MFIF 135 decapsulates and interprets the message. The MFIF 135 uses a modified XML schema to interpret the PDIF-LO element to extract subscriber station identification information such as, but not limited to, Mobile Station Identity (IMSI), Authentication parameters (including AUTHR, RANDC, RAND), and possibly other information needed to identify the mobile and its capabilities (ESN, MEID, Mobile Capabilites, Classmark Information).

The MFIF 135 then transmits the message to the MSC 150 in step 225. The MFIF 135 sends the message to MSC 150 via MAP 140. The MFIF 135 formats the message in accordance with existing network standards for forwarding signalling information to the MSC (e.g, cdma2000 signaling).

Although the communications have been shown to traverse a path from the SS 116 to the MSC 150, it will be understood that communications from the MSC 150 to the SS 116 undergo a similar process. For example, a message from the MSC 150 is sent to the SS 116 via MAP 140 and MFIF 135. The MFIF 135 encapsulates the message. Thereafter, the MFIF 135 sends the message via IMS 130 and FGTW 106 to FAP 104. The FAP decapsulates the message for delivery to the SS 116. The SS 116 receives the message from FAP 104 using in accordance with existing network standards for reverse signalling information from the MSC 150.

In additional embodiments, the modified XML schema in each of the FAP 104 and MFIF 135 includes support for information contained in the messages such as Flash with Information and Feature Notification.

Embodiments of the present disclosure provide a Femto access point configured with a modified XML schema and a MSC Femto Interworking function configured with a modified XML schema. The modified XML schema is configured to interpret additional information regarding the subscriber station. By adding the rules for interpreting this additional information to the PDIF-LO XML schema, the SIP-based FAP 104 and MFIF 135 can receive and properly support Registration Messages from the SS 116.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communications network, a Femto Access Point (FAP) capable of communicating messages via an internet protocol, said FAP comprising:
   a modified XML schema configured to include subscriber station identification information in a Presence Information Data Format Location (PIDF-LO) signal, wherein said FAP is configured to transmit the PIDF-LO via session initiation protocol to a mobile switching center (MSC) Femto Interworking Function (MFIF), wherein the PIDF-LO signal is configured to be interpreted by an XML schema of the MFIF to extract the subscriber station identification information, the MFIF configured to send the messages and the subscriber station information to a MSC.

2. The FAP as set forth in claim 1, wherein said FAP is configured to encapsulate said messages as Multipurpose Internet Mail Extention messages.

3. The FAP as set forth in claim 1, wherein said subscriber station identification information includes a mobile station identity (IMSI).

4. The FAP as set forth in claim 1, wherein said subscriber station identification information includes authentication parameters.

5. The FAP as set forth in claim 1, wherein said subscriber station identification information includes at least one of: an electronic serial number, a mobile equipment identifier, mobile capabilities, and classmark information.

6. The FAP as set forth in claim 1, wherein said subscriber station identification information includes instructions for supporting information contained in a Flash with Information message.

7. The FAP as set forth in claim 1, wherein said subscriber station identification information includes information supporting feature notification.

8. For use in a wireless communications network, a Femto network capable of communicating messages via an internet protocol, said Femto network comprising:
   a Femto Access Point (FAP), said FAP comprising a first modified XML schema configured to include subscriber station identification information in a Presence Information Data Format Location (PIDF-LO) signal, wherein said FAP is configured to transmit said PIDF-LO signal via session initiation protocol; and
   an MSC Femto Interworking Function (MFIF), said MFIF comprising a second XML schema configured to interpret said PIDF-LO signal and extract said subscriber station identification information from said PIDF-LO signal, wherein said MFIF is configured to send said messages and said subscriber station information to a mobile switching center (MSC).

9. The Femto network as set forth in claim 8, wherein said FAP is configured to encapsulate said messages as Multipurpose Internet Mail Extention messages.

10. The Femto network as set forth in claim 9, wherein said MFIF is configured to open said encapsulated messages.

11. The Femto network as set forth in claim 8, wherein said subscriber station identification information includes a mobile station identity (IMSI).

12. The Femto network as set forth in claim 8, wherein said subscriber station identification information includes authentication parameters.

13. The Femto network as set forth in claim 8, wherein said subscriber station identification information includes at least one of: an electronic serial number, a mobile equipment identifier, mobile capabilities, and classmark information.

14. The Femto network as set forth in claim 8, wherein said subscriber station identification information includes instructions for supporting information contained in a Flash with Information message.

15. The Femto network as set forth in claim 8, wherein said subscriber station identification information includes information supporting feature notification.

16. For use in a Femto network capable of relaying wireless messages, a method of communicating messages via an internet protocol, the method comprising:
   transmitting, at a Femto Access Point (FAP), a Presence Information Data Format Location (PIDF-LO) signal via session initiation protocol, the FAP comprising a first modified XML schema configured to include subscriber station identification information in the PIDF-LO signal;
   receiving, at a mobile switching center (MSC) Femto Interworking Function (MFIF), the PIDF-LO signal via the session initiation protocol from the FAP;

using, at the MFIF, a second XML schema to extract the subscriber station identification information from the PIDF-LO signal; and sending the messages and the subscriber station identification information to a mobile switching center.

17. The method as set forth in claim 16, wherein receiving a the PIDF-LO signal further comprises receiving an encapsulated message as a Multipurpose Internet Mail Extention message.

18. The method as set forth in claim 17, further comprising further comprising opening the encapsulated message.

19. The method as set forth in claim 16, wherein the subscriber station identification information includes at least one of: a mobile station identity (IMSI); authentication parameters; an electronic serial number; a mobile equipment identifier; mobile capabilities; and classmark information.

20. The method as set forth in claim 16, wherein the subscriber station identification information includes at least one of: instructions for supporting information contained in a Flash with Information message; and information supporting feature notification.

* * * * *